(12) United States Patent
Gu et al.

(10) Patent No.: US 9,335,922 B2
(45) Date of Patent: May 10, 2016

(54) ELECTRONIC DEVICE INCLUDING THREE-DIMENSIONAL GESTURE DETECTING DISPLAY

(71) Applicant: RESEARCH IN MOTION LIMITED, Waterloo (CA)

(72) Inventors: Huanhuan Gu, Kitchener (CA); James Paul Warden, Forth Worth, TX (US); Arnold Sheynman, Northbrook, IL (US)

( * ) Notice: Subject to any disclaimer, the term of this patent is extended or adjusted under 35 U.S.C. 154(b) by 139 days.

(21) Appl. No.: 13/743,264

(22) Filed: Jan. 16, 2013

(65) Prior Publication Data

US 2014/0198073 A1 Jul. 17, 2014

(51) Int. Cl.
| | |
|---|---|
| G06F 3/01 | (2006.01) |
| G06F 3/041 | (2006.01) |
| G06F 3/046 | (2006.01) |
| G06F 3/0488 | (2013.01) |
| G06K 19/07 | (2006.01) |
| G06K 9/00 | (2006.01) |

(52) U.S. Cl.
CPC ............ *G06F 3/04883* (2013.01); *G06F 3/017* (2013.01); *G06F 3/046* (2013.01); *G06F 3/041* (2013.01); *G06K 9/00201* (2013.01); *G06K 19/0723* (2013.01)

(58) Field of Classification Search
CPC .............. G06F 3/0488; G06F 3/04815; G06F 3/00–3/008; G06K 9/00201; H04N 1/00381; H04N 1/0203; H04N 1/0253; H04N 13/0203; H04N 13/0253
USPC ............ 345/173, 158; 342/26 B, 113, 59, 52; 382/154, 103; 340/10.52; 463/39
See application file for complete search history.

(56) References Cited

U.S. PATENT DOCUMENTS

| | | | | |
|---|---|---|---|---|
| 4,907,001 | A * | 3/1990 | Harmuth | 342/159 |
| 5,907,568 | A * | 5/1999 | Reitan, Jr. | 342/26 B |
| 6,204,804 | B1 * | 3/2001 | Andersson | 342/113 |
| 6,281,599 | B1 * | 8/2001 | Murakami | B60R 25/24 180/287 |
| 6,608,597 | B1 * | 8/2003 | Hadzoglou | H01Q 1/1285 343/713 |
| 6,771,208 | B2 * | 8/2004 | Lutter et al. | 342/52 |
| 7,532,202 | B2 | 5/2009 | Roberts | |
| 8,064,408 | B2 | 11/2011 | Woodsum | |
| 8,077,074 | B2 * | 12/2011 | Venkatachalam et al. | 342/59 |
| 8,194,049 | B2 | 6/2012 | Oki | |
| 8,284,165 | B2 | 10/2012 | Koshiyama et al. | |
| 8,600,462 | B2 * | 12/2013 | Kato | H01Q 21/28 343/751 |
| 8,693,731 | B2 * | 4/2014 | Holz et al. | 382/103 |
| 8,704,535 | B2 | 4/2014 | Chen et al. | |
| 8,902,597 | B2 | 12/2014 | Sato | |
| 2001/0014171 | A1 * | 8/2001 | Iijima et al. | 382/154 |

(Continued)

OTHER PUBLICATIONS

Jerry L. Eaves and Edward K. Reedy, Principles of Modern Radar, (c) 1987 Van Nostrand Reinhold Company Inc., ISBN 0-442-22104-5, pp. 1-2.*

(Continued)

*Primary Examiner* — Larry Sternbane
*Assistant Examiner* — Darlene M Ritchie
(74) *Attorney, Agent, or Firm* — Borden Ladner Gervais LLP; Geoffrey Dekleine

(57) ABSTRACT

An electronic device includes a display, a plurality of antennae arranged and constructed to emit a signal and to receive backscatter from the signal, and a processor operably coupled to the antennae to utilize the received backscatter to detect location and at least one of size and shape of an object spaced from the display.

12 Claims, 5 Drawing Sheets

(56) References Cited

U.S. PATENT DOCUMENTS

| | | |
|---|---|---|
| 2004/0183788 A1* | 9/2004 | Kurashima et al. .......... 345/173 |
| 2006/0161871 A1 | 7/2006 | Hotelling et al. |
| 2006/0267953 A1 | 11/2006 | Peterson, Jr. et al. |
| 2008/0100572 A1* | 5/2008 | Boillot ......................... 345/158 |
| 2008/0122803 A1 | 5/2008 | Izadi et al. |
| 2008/0143671 A1 | 6/2008 | Li |
| 2008/0231603 A1 | 9/2008 | Parkinson et al. |
| 2008/0238885 A1 | 10/2008 | Zachut et al. |
| 2009/0085881 A1 | 4/2009 | Keam |
| 2009/0227882 A1* | 9/2009 | Foo ...................... A61B 5/0205 600/508 |
| 2010/0026470 A1* | 2/2010 | Wilson .................... G06F 3/046 340/10.52 |
| 2010/0177052 A1 | 7/2010 | Chang et al. |
| 2011/0063224 A1 | 3/2011 | Vexo et al. |
| 2011/0096024 A1 | 4/2011 | Kwak |
| 2011/0120784 A1 | 5/2011 | Osoinach et al. |
| 2011/0205151 A1 | 8/2011 | Newton et al. |
| 2011/0216016 A1 | 9/2011 | Rosener |
| 2011/0267296 A1 | 11/2011 | Noguchi et al. |
| 2011/0314425 A1 | 12/2011 | Chiang |
| 2012/0050180 A1 | 3/2012 | King et al. |
| 2012/0062514 A1 | 3/2012 | Yu |
| 2012/0086647 A1 | 4/2012 | Birkler |
| 2012/0092254 A1 | 4/2012 | Wong et al. |
| 2012/0092284 A1 | 4/2012 | Rofougaran et al. |
| 2012/0133597 A1 | 5/2012 | Chen |
| 2012/0169400 A1 | 7/2012 | Liu |
| 2013/0063370 A1 | 3/2013 | Lee et al. |
| 2013/0084984 A1* | 4/2013 | Gagner et al. .................. 463/39 |
| 2013/0187863 A1 | 7/2013 | Rydenhag et al. |
| 2013/0208948 A1* | 8/2013 | Berkovich et al. ............ 382/103 |
| 2013/0229499 A1* | 9/2013 | Zhao et al. ....................... 348/51 |
| 2013/0285972 A1 | 10/2013 | Elias et al. |
| 2014/0106684 A1* | 4/2014 | Burns .................... H01Q 1/243 455/78 |
| 2014/0160054 A1 | 6/2014 | Rabii et al. |

OTHER PUBLICATIONS

International Search Report and Written Opinion dated Oct. 11, 2013, issued from the corresponding International patent application No. PCT/US2013/021732.

* cited by examiner

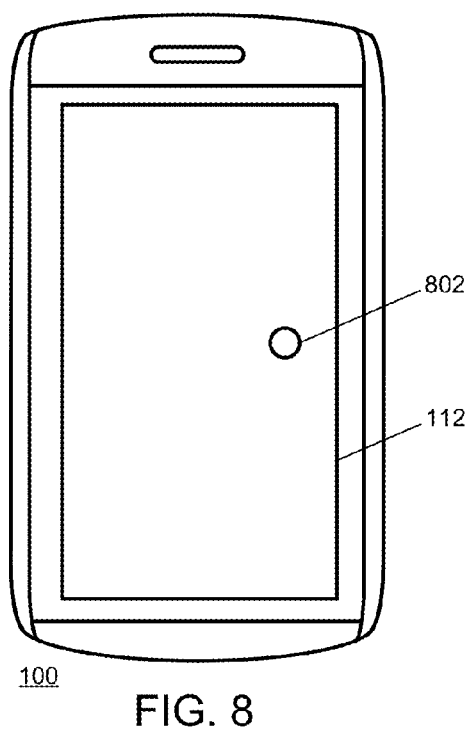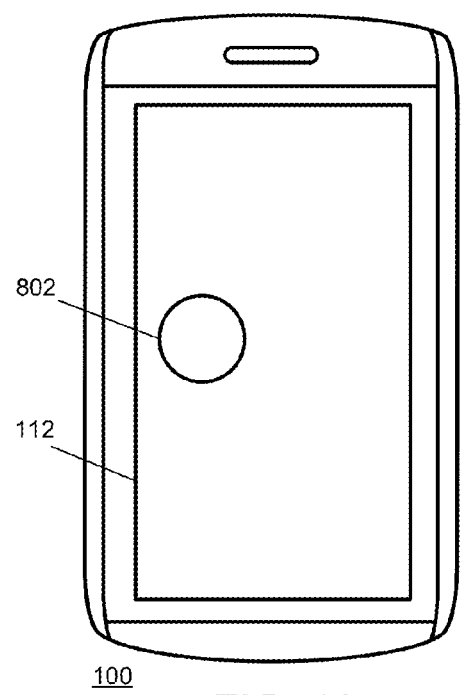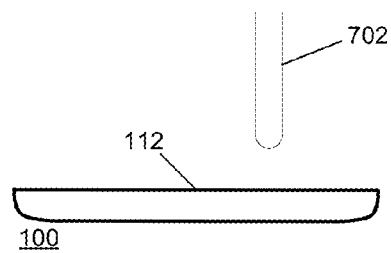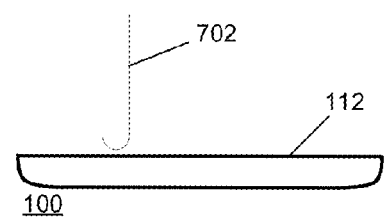
FIG. 8
FIG. 10
FIG. 7
FIG. 9

****

ELECTRONIC DEVICE INCLUDING THREE-DIMENSIONAL GESTURE DETECTING DISPLAY

FIELD OF TECHNOLOGY

The present disclosure relates to electronic devices, including but not limited to, portable electronic devices having three-dimensional gesture detecting displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touchscreen display, and displays or devices capable of detecting objects spaced from the display are particularly useful on handheld devices, which are small and have limited space for user input and output. The information displayed on the touch-sensitive displays may be modified depending on the functions and operations being performed.

Improvements in devices capable of detecting objects that are spaced from the display are desirable.

BRIEF DESCRIPTION OF THE DRAWINGS

FIG. 7 through FIG. 10 illustrate an example of object detection and a resulting change in a displayed object.

DETAILED DESCRIPTION

Figure 1:
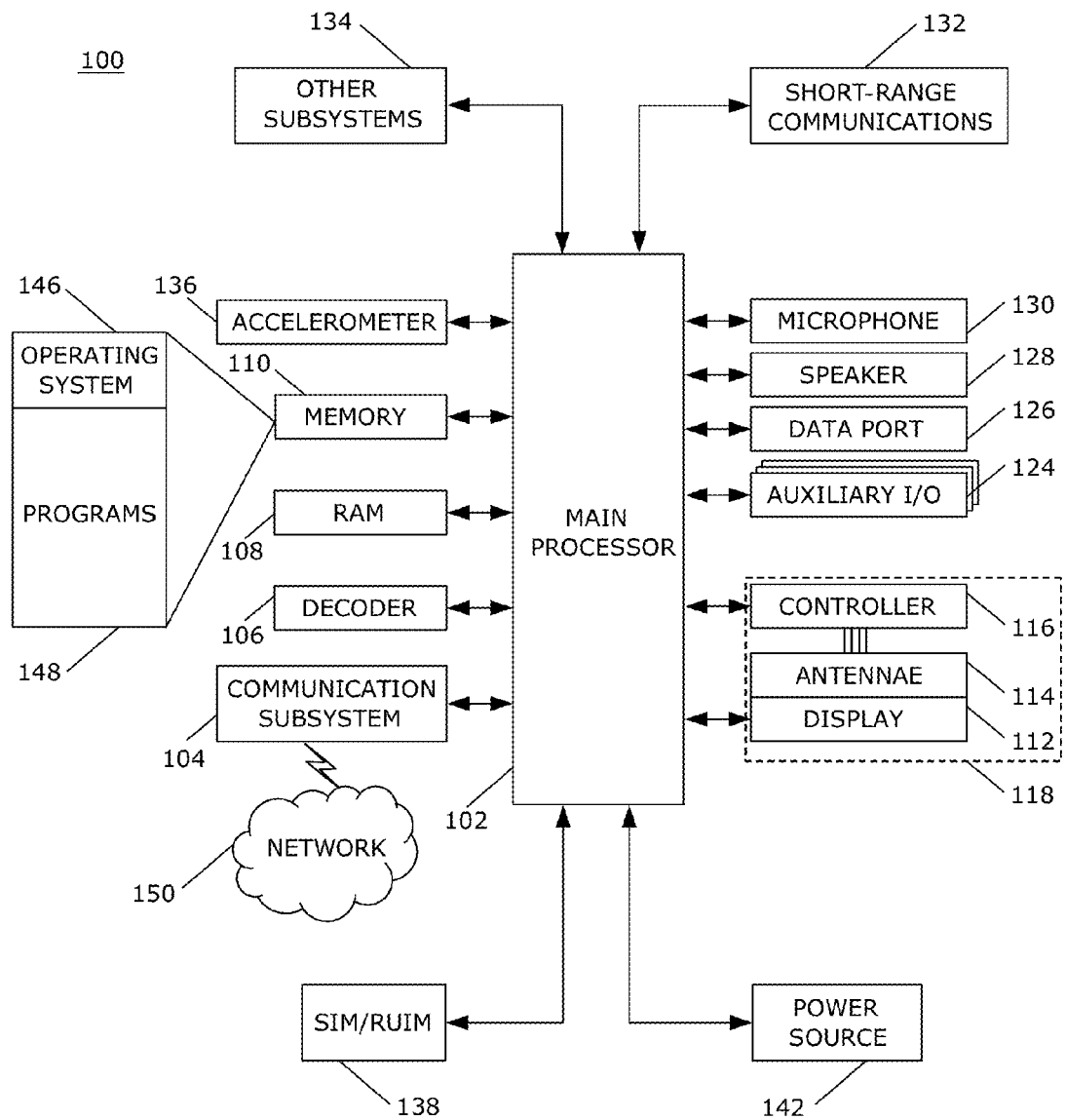
FIG. 1 is a block diagram of a portable electronic device in accordance with the disclosure.

The following describes an electronic device and a three-dimensional gesture detecting display that includes a plurality of antennae arranged and constructed to emit a signal and to receive backscatter from the signal, and a processor operably coupled to the antennae to utilize the received backscatter to detect location and at least one of size and shape of an object spaced from the display.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device or non-portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The portable electronic device may be a portable electronic device without wireless communication capabilities, such as handheld electronic games, digital photograph albums, digital cameras, media players, e-book readers, and so forth. Examples of non-portable electronic devices include desktop computers, electronic white boards, smart boards utilized for collaboration, built-in monitors or displays in furniture or appliances, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a three-dimensional gesture detecting display 118, an auxiliary input/output (I/O) subsystem 124, a data port 126, a speaker 128, a microphone 130, short-range communications 132 and other device subsystems 134. The three-dimensional gesture detecting display 118 includes a display 112 and antennae 114 that are coupled to at least one controller 116 that is utilized to interact with the processor 102. The controller 116 and antennae 114 are utilized as a transceiver to transmit and receive signals. Input via a graphical user interface is provided via the three-dimensional gesture detecting display 118. Information, such as text, characters, symbols, images, icons, and other items that may be displayed or rendered on a portable electronic device, is displayed on the display 112 via the processor 102. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The three-dimensional gesture detecting display 118 includes the antennae 114. The antennae 114 may include transmit antennae and receive antennae. Alternatively, the antennae may include antennae that are operable to transmit and to receive signals. The antennae may comprise any suitable material, such as indium tin oxide (ITO). The antennae may be formed, for example, by depositing ITO on one or more layers on the display 112 and patterning to form the antennae.

One or more objects may be detected by the three-dimensional gesture detecting display 118. The processor 102 may determine attributes of the object, including a location of the object. Location data may include data for a size of an object, a location of the object or location or a single point on the object, such as a point at or near a center of a detected area. The location of a detected object may include x, y, and z components, e.g., horizontal and vertical components, with respect to one's view of the display 112, and distance from the display 112, respectively. The detected object may be a finger, thumb, hand, appendage, or other objects, for example, a stylus, pen, or other pointers.

One or more gestures may also be detected by the three-dimensional gesture detecting display 118. A gesture, such as a movement of an object relative to the three-dimensional gesture detecting display 118, may be identified by attributes of the gesture, including the origin point, the end point, the distance travelled, the duration, the velocity, and the direction, for example. A gesture may be long or short in distance and/or duration. Two points of a gesture may be utilized to determine a direction of the gesture. A gesture may also include a hover. A hover may occur when an object is at a location that is spaced from the three-dimensional gesture detecting display 118 and that is generally unchanged over a period of time.

The display 112 includes a display area in which information may be displayed, and a non-display area extending around the periphery of the display area. The non-display area is utilized to accommodate, for example, electronic traces or electrical connections, adhesives or other sealants, and/or protective coatings around the edges of the display area and information is not displayed in the non-display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. Antennae 114 may be disposed in the non-display area, which antennae extend from the display area or may be distinct or separate antennae from the antennae in the display area.

Figure 2:
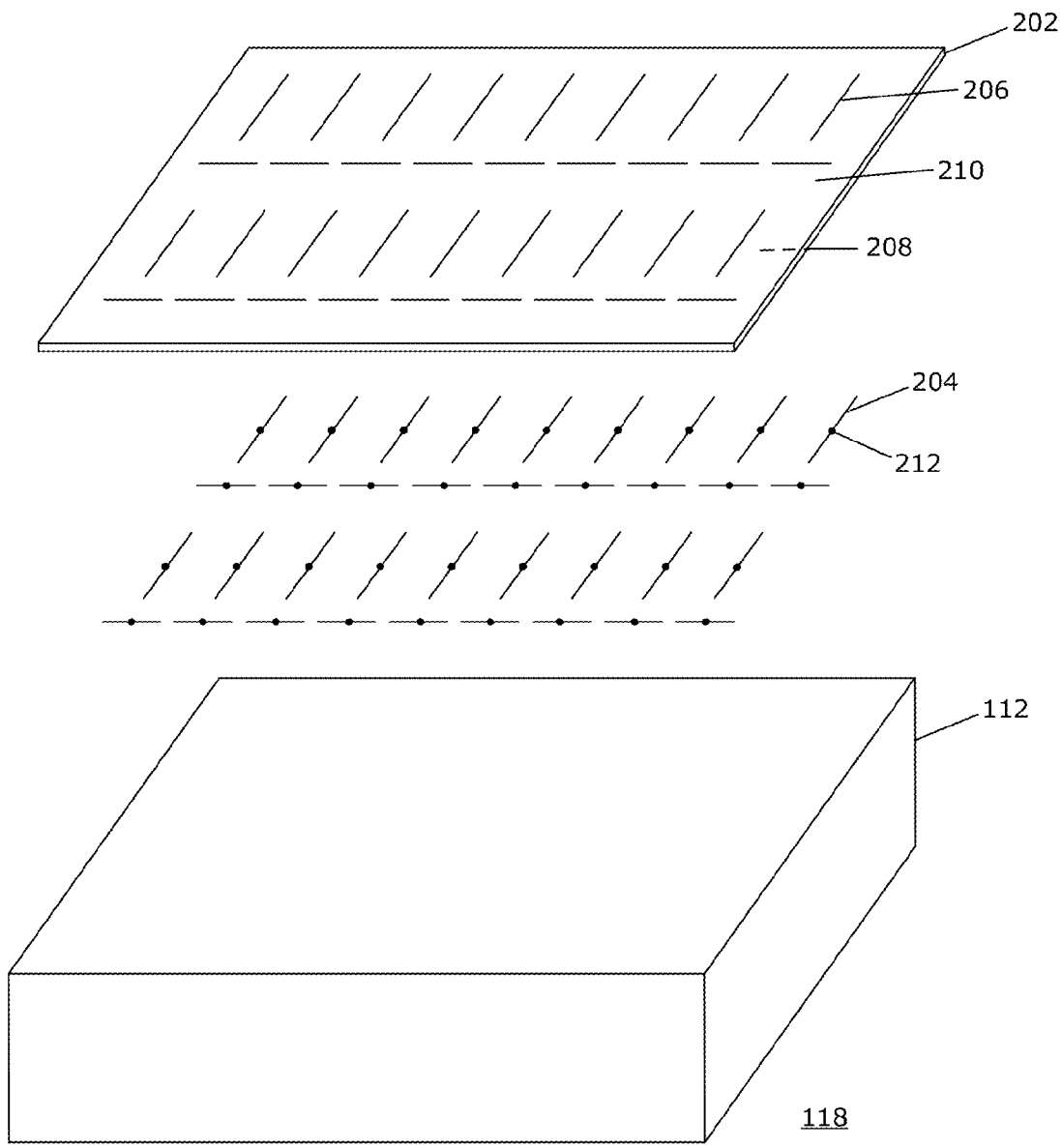
FIG. 2 is an exploded view of a three-dimensional gesture detecting display of an electronic device in accordance with the disclosure.

An exploded view of one example of a three-dimensional gesture detecting display 118 of an electronic device 100 is shown in FIG. 2. The three-dimensional gesture detecting display 118 includes the display 112 and a substrate 202 disposed on the display 112. The substrate 202 may be any suitable dielectric or insulator material such as glass. The antennae 114 are disposed on the substrate 202. In this example, the antennae 114 include transmit antennae 204 disposed on one surface 208 of the substrate 202 and receive antennae 206 disposed on an opposite surface 210 of the substrate 202. The transmit antennae 204 are disposed on the surface 208 of the substrate 202 that is closest to or on the display 112 such that the receive antennae 206 are disposed on an outer surface of the substrate 202 or the surface 210 that is farthest from the display 112. Thus, the transmit antennae 204 are disposed on a different layer of the three-dimensional gesture detecting display 118 than the receive antennae 206.

The transmit antennae 204 are arranged in an array on the surface 208 of the substrate 202 and the receive antennae 206 are arranged in an array on the opposite surface 210 of the substrate 202 to provide co-polarized dipoles. Alternatively, cross-polarized antennae may be successfully implemented. A local measurement of the received signal is taken at the port 212 for each receive antenna 206 when in use.

The transmit antennae 204 and the receive antennae 206 are controlled by the controller 116. The controller 116 controls when the antennae are turned on or when they operate. The transmit antennae 204 transmits a radio signal, in the MHz or GHz range, such as a microwave signal. The received signal from the port 212 of the receive antennae 206 is an electromagnetic wave that is utilized to determine the electric field and/or the magnetic field. The electric field and the magnetic field from each of the receive antennae 206 are utilized to detect an object that is spaced from the three-dimensional gesture detecting display 118. The voltage signal from the receive antennae 206 may also be utilized to detect an object that is spaced from the three-dimensional gesture detecting display 118.

An object that is spaced from the three-dimensional gesture detecting display 118, is detected based on changes in the electric field and/or the magnetic field when the object enters the space in front of the three-dimensional gesture detecting display 118, compared to the electric field and/or the magnetic field measured when no object is present. Radar positioning techniques may be utilized to determine the location of the object and the time differences between transmitted signals and received signals may be utilized to determine the distance of the object from the three-dimensional gesture detecting display 118.

Changes in the electric field or magnetic field are determined when the distance between the object and the three-dimensional gesture detecting display 118 changes, i.e., the object moves toward or away from the three-dimensional gesture detecting display 118. The changes in the electric field or magnetic field facilitate detection of distance between the three-dimensional gesture detecting display 118 and the object. Thus, movement toward or away from the three-dimensional gesture detecting display 118 may be detected.

Changes in the electric field or the magnetic field are also determined when the object moves relative to the three-dimensional gesture detecting display 118, but the distance between the three-dimensional gesture detecting display 118 and the object is generally unchanged, i.e., the object moves generally parallel to the three-dimensional gesture detecting display 118. Thus, movement in a plane that is generally parallel to the three-dimensional gesture detecting display 118 may also be detected.

Movement of an object in any direction may be detected based on calculations utilizing the electric field changes and/or the magnetic field changes. The shape of an object may also be determined such that a large object is distinguishable from a small object. The size and shape of the object is determined, for example, based on the changes in the electric field compared to the electric field when an object is not present. Microwave-based imaging may be performed. Thus, in addition to location, shape and/or size may be determined, for example, to identify the object.

When a finger is detected, localized changes in voltage occur as compared to voltage measured when no object is present. For example, significant differences in voltage may be detected at two receive antennae 206. When a palm is detected, changes in voltage occur over a greater area, as compared to voltage measured when no object is present. For example, significant differences in voltage may be detected at all receive antennae 206. This difference occurs because of the size difference between a finger and a palm. Because the palm is larger, the measured voltage is affected or changed at more receive antennae. Utilizing multiple transmit antennae 204 and receive antennae 206, voltage differences determined for each receive antennae 206 may differ depending on the object, providing additional information from which shape is determined.

Movement of the object is also detected such that gestures may be identified based on the gesture attributes such as speed, shape, and direction. Thus, in addition to detecting location and movement of an object, the object may be identified. The number of gestures that may be determined or distinguished is greater compared to a device that is incapable of detecting or identifying size or shape of an object because the three-dimensional gesture detecting display 118 may be utilized to detect and distinguish between objects of different sizes and between shapes of objects, such as shapes that a hand may take, including shapes in which a finger or fingers are extended or a "thumbs-up" shape, for example.

Figure 3:
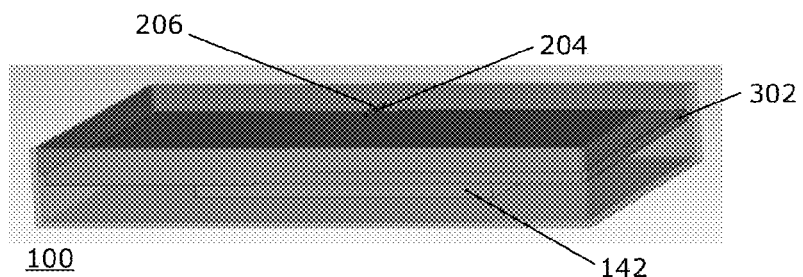
FIG. 3 is a simplified perspective view of an electronic device.
Figure 4:
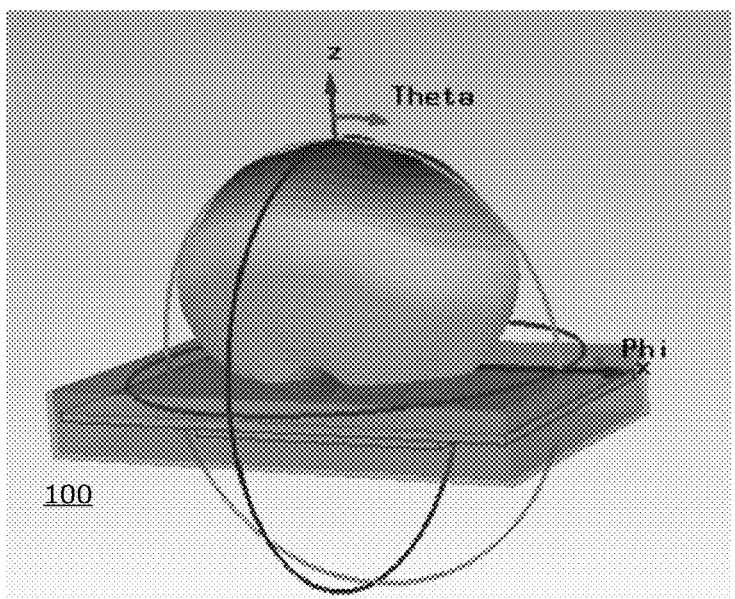
FIG. 4 is a perspective view illustrating the electromagnetic field created by antennae of the electronic device of FIG. 3.
Figure 5:
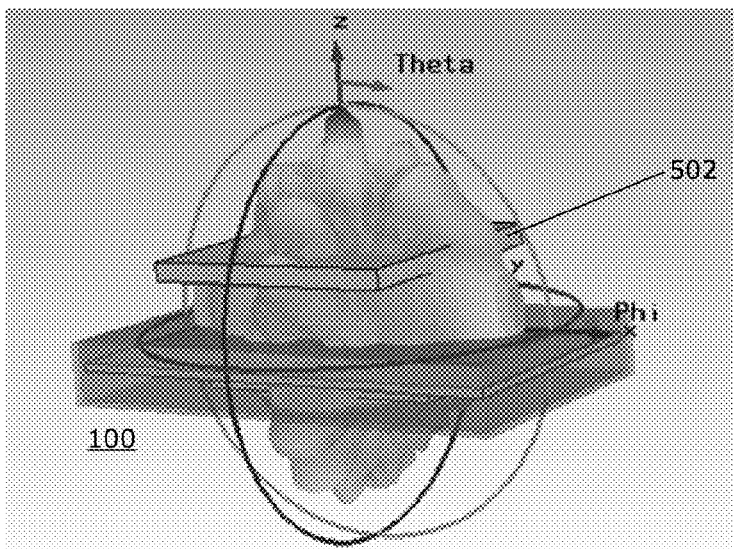
FIG. 5 is a perspective view illustrating the effect of an object in the electromagnetic field of FIG. 4.

A simplified perspective view of an example of a portable electronic device 100 is illustrated in FIG. 3, FIG. 4, and FIG. 5. In the simplified view of FIG. 3, the portable electronic device 100 includes a single transmit antenna 204 and a single receive antenna 206 that are disposed on surfaces of a substrate of the portable electronic device 100. The portable electronic device 100 includes a printed circuit board 302 that is utilized to support and couple electronic components of the portable electronic device 100. A power source 142, which in this example is a battery, is also illustrated.

The far field pattern of the electromagnetic field that is created when the transmit antenna 204 of FIG. 3 is excited is illustrated in FIG. 4. In the example of FIG. 4, no object is present in the electromagnetic field. The far field pattern of the electromagnetic field is affected by the presence of an object spaced from the three-dimensional gesture detecting display 118. A far field pattern of the electromagnetic field when an object 502 is present in the field is illustrated in FIG. 5. In the simplified example of FIG. 5, the object 502 is a rectangular parallelepiped. Objects of other shapes affect the pattern of the electromagnetic field such that the pattern of the electromagnetic field differs when different objects are present in the field, compared to the pattern of the electromagnetic field when no object is present.

Signals are transmitted from the transmit antenna 204 and backscatter from the signals is received at the receive antennae 206. Backscatter refers to the signal sent from a transmit antennae 204 that is reflected or scattered from an object such as a finger or hand. The backscatter is analyzed to detect the object.

The received signal from the receive antennae 206 is an electromagnetic wave that is utilized to determine the electric field and/or the magnetic field. The signal from each receive antennae 206 is utilized to detect an object that is spaced from the three-dimensional gesture detecting display 118. The voltage signal from the receive antennae 206 may also be utilized to detect an object that is spaced from the three-dimensional gesture detecting display 118. The signals received at the receive antennae are sampled regularly and analyzed to detect objects spaced from the three-dimensional gesture detecting display 118. The signals are collected and the corresponding equation, e.g., Maxwell equation at low frequency, is solved iteratively for different gestures to obtain the solution that is closest to the collected values. For example, a library or table of predefined gestures or objects may be stored on the portable electronic device 100. The expected signals for the predefined gestures or objects may be determined utilizing corresponding Maxwell equations. The expected signals may be determined and stored in the library or table stored on the portable electronic device 100. The expected signals for one of the predefined gesture or objects are compared to the measured signals from each of the receive antennae 206 to determine whether or not the expected signals for the predefined gesture or object match the measured signals from each of the receive antennae 206, within an acceptable error threshold. When a match is identified, within the error threshold, the associated predefined gesture or object is identified as the detected gesture or object. When a match is not identified, the expected signals for a next predefined gesture or object are compared the measure signals. Thus, the process continues until an acceptable match is found or until no predefined gesture or object is a sufficient match.

Figure 6:
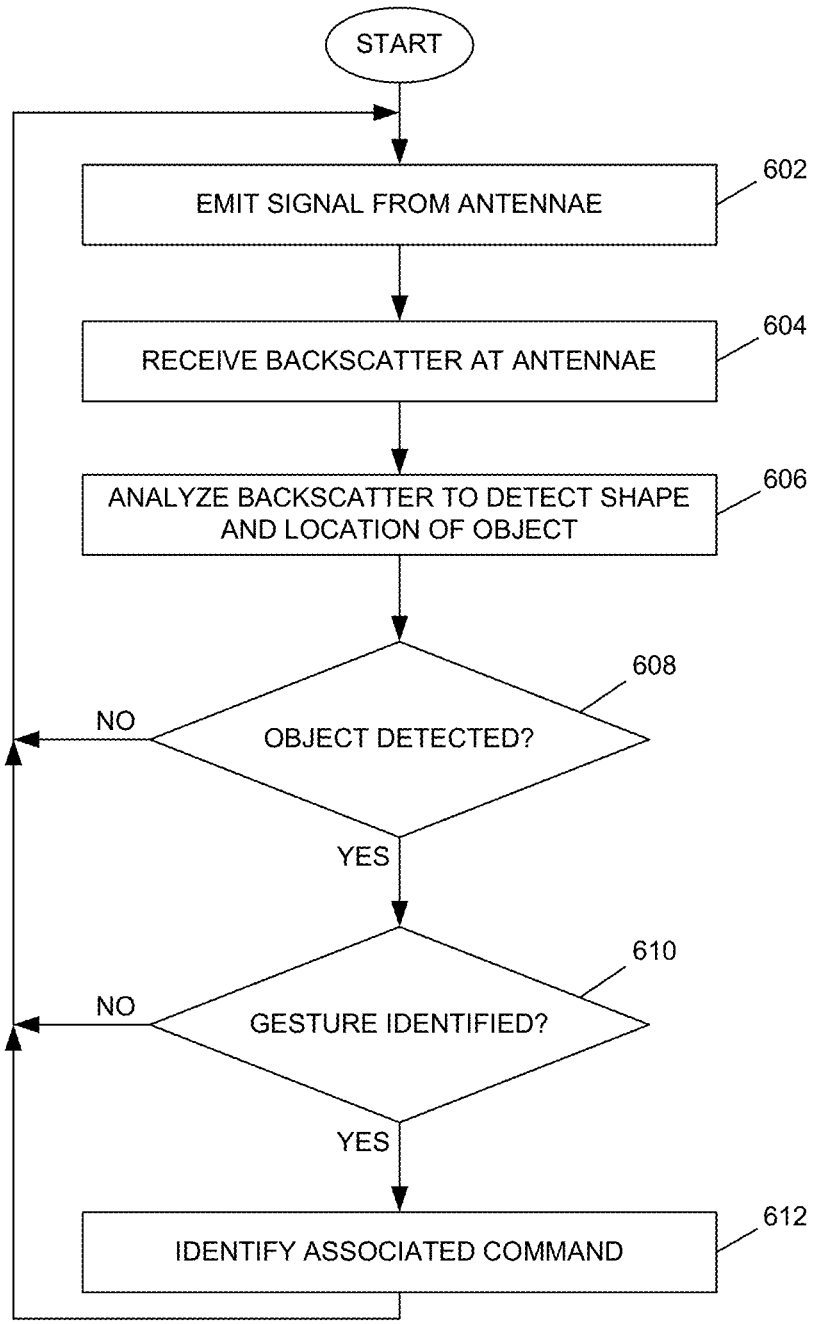
FIG. 6 is a flowchart illustrating a method of detecting attributes, including location of an object in accordance with the disclosures.

A flowchart illustrating a method of detecting attributes of an object spaced from the display 112, such as the three-dimensional gesture detecting display 118 of FIG. 2, is illustrated in FIG. 6. The method may be carried out by software executed, for example, by the controller 116 and the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable storage medium, such as a computer-readable storage device.

The transmit antennae 204 are controlled by the controller 116 and signals are emitted 602 from the transmit antennae 204. As described, the signals are high frequency signals in the MHz or GHz range, such as a microwave signal.

Backscatter from the signals is received 604 at the receive antennae 206. The backscatter is analyzed 306 to detect location of an object. The backscatter may also be analyzed 606 to detect the size and/or shape of the object. When an object is detected at 608, the attributes of the object, including location, size and/or shape, are compared to previous attributes of the object based on previously measured values, to identify 610 a gesture. When a gesture is not identified, the process continues at 602 to continue to monitor the object to identify gestures by repeating signal emission from the transmit antennae 204, receiving backscatter at the receive antennae 206 and analyzing to detect location and at least one of size and shape of the object. Thus, values are measured dynamically to detect an object and to detect changes in object attributes such as location. The gesture is identified by comparing attributes of the gesture to attributes of known gestures or defined gestures. When a gesture is identified at 610, the associated command is identified 612. For example, a gesture may be associated with a command utilizing a look-up table. Any suitable command may be utilized. For example, commands may be utilized to open or launch an application, to close an application, to proceed to a next photo or image, to reverse back to a previous image, to scroll, and to zoom, to name a small number of examples.

One example of object detection is illustrated in FIG. 7 through FIG. 10. A side view of one example of a portable electronic device 100 is shown in FIG. 7 and a front view the portable electronic device 100 is shown in FIG. 8. In the example of FIG. 7 and FIG. 8, an object 702 is present in the electromagnetic field that is created as signals are emitted from the transmit antennae 204 and backscatter is received at the receive antennae 206. The backscatter is analyzed and the size and general shape of the object 702 is detected. For the purpose of the present example, a corresponding object 802 is displayed on the display 112 of the portable electronic device 100.

The object 702 moves from right to left in the orientation of the portable electronic device 100 illustrated in FIG. 9 and FIG. 10 and movement of the object is detected. For the purpose of the present example, the corresponding object 802 that is displayed on the display 112 of the portable electronic device 100, also moves from right to left in the illustrated orientation. The object 702 also moves closer to the display 112 such that the distance between the object 702 and the display 112 is reduced and the size of the corresponding object 802 that is displayed on the display 112 of the portable electronic device 100, changes to illustrate the change in distance between the object 702 and the display 112. In this example, a reduction in distance between the object 702 and the display 112 is illustrated by an increase in the size of the corresponding object 802 displayed on the display 112.

An electronic device includes a display, a plurality of antennae arranged and constructed to emit a signal and to receive backscatter from the signal, and a processor operably coupled to the antennae to utilize the received backscatter to detect location and at least one of size and shape of an object spaced from the display.

A method of detecting an object spaced from a display of an electronic device, includes emitting a signal from and receiving backscatter at a plurality of antennae of the electronic device, and utilizing the received backscatter to detect location and at least one of size and shape of the object spaced from the display.

Advantageously, size and/or shape of an object located in front of and spaced from the display 112 may be detected in addition to location. Utilizing such information, a finger may be distinguished from multiple fingers or from a palm, for example. Thus, the number of attributes of an object or a gesture that may be determined is greater and the number of gestures that may be identified is therefore greater than the number that may be identified utilizing a device that is incapable of detecting or distinguishing size or shape. Further, the distance from the display 112 at which an object may still be detected is greatly increased by comparison to capacitive-type three-dimensional gesture detection in which objects must be very close to the display 112, to be detected.

The present disclosure may be embodied in other specific forms without departing from the essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An electronic device comprising:
    a display;
    a dielectric substrate disposed on the display;
    a plurality of antennae including a plurality of transmit antennae disposed on a first side of the substrate disposed on the display and arranged and constructed to emit radio waves, and a plurality of receive antennae disposed in an array on a second side of the substrate disposed on the display to receive backscatter from the radio waves such that the transmit antennae and receive antennae are disposed on opposite surfaces of the dielectric substrate and the transmit antennae and receive antennae and the substrate are all disposed on the display;
    a processor operably coupled to the plurality of antennae to utilize the received backscatter to:
        detect voltage at each of the receive antennae disposed in the array on the display; and
        based on which ones of the plurality of receive antennae disposed in the array at which voltage changes are detected, detect location of an object spaced from the display, size of the object, and shape of the object;
        identify the object based on the size of the object and the shape of the object;
        determine at least one attribute of a gesture including at least one of gesture speed, gesture shape, or gesture direction based on repeatedly detecting the location of the object;
        identify the gesture based on the object identified and the at least one attribute of the gesture; and
        identify a command associated with the gesture.

2. The electronic device according to claim 1, wherein the processor is arranged and constructed to:
    compare the gesture to known gestures to identify the command associated with the gesture.

3. The electronic device according to claim 1, wherein the radio waves comprise micro waves.

4. The electronic device according to claim 1, wherein the backscatter comprises a received signal from which at least one of an electric field or a magnetic field is determined.

5. The electronic device according to claim 1, wherein the plurality of antennae are arranged in an antenna array.

6. A method of detecting an object spaced from a display of an electronic device, comprising:
    emitting radio waves from a plurality of transmit antennae disposed on a first side of a substrate disposed on a display of the electronic device and receiving backscatter at a plurality of receive antennae disposed in an array on a second side of the substrate disposed on the display of the electronic device, such that the transmit antennae and receive antennae are disposed on opposite surfaces of the dielectric substrate and the transmit antennae and receive antennae and the substrate are all disposed on the display;
    utilizing the received backscatter to:
        detect voltage at each of the receive antennae disposed in the array on the display; and
        based on which ones of the plurality of receive antennae disposed in the array at which voltage changes are detected, detect location of the object spaced from the display, size of the object, and shape of the object;

identify the object based on the size of the object and the shape of the object;

determine at least one attribute of a gesture including at least one of gesture speed, gesture shape, or gesture direction based on repeatedly detecting the location of the object;

identify the gesture based on the object identified and the at least one attribute of the gesture; and identify a command associated with the gesture.

7. The method according to claim 6, wherein the processor is arranged and constructed to compare the gesture to known gestures to identify the command.

8. The method according to claim 6, wherein the backscatter comprises a received signal from which an electric field and a magnetic field is determined.

9. The method according to claim 6, wherein emitting radio waves from and receiving backscatter at a plurality of antennae comprises emitting the radio waves from a plurality of transmit antennae on the display and receiving backscatter at a plurality of receive antennae on the display.

10. A non-transitory computer-readable storage device having computer-readable code stored thereon, the computer-readable code executable by at least one processor of a portable electronic device to:

cause a plurality of transmit antennae disposed on a first side of a substrate disposed on a display of the portable electronic device to emit radio waves and a plurality of receive antennae disposed in an array on a second side of the substrate disposed on the display to receive backscatter, such that the transmit antennae and receive antennae are disposed on opposite surfaces of the dielectric substrate and the transmit antennae and receive antennae and the substrate are all disposed on the display; and utilize the received backscatter to:

detect voltage at each of the receive antennae disposed in the array on the display; and based on which ones of the plurality of receive antennae disposed in the array at which voltage changes are detected, detect location of the object spaced from the display, size of the object, and shape of the object;

identify the object based on the size of the object and the shape of the object;

determine at least one attribute of a gesture including at least one of gesture speed, gesture shape, or gesture direction based on repeatedly detecting the location of the object;

identify the gesture based on the object identified and the at least one attribute of the gesture; and identify a command associated with the gesture.

11. The non-transitory computer-readable storage device according to claim 10, wherein the radio waves comprise micro waves.

12. The non-transitory computer-readable storage device according to claim 10, wherein the backscatter comprises a received signal from which at least one of an electric field or a magnetic field is determined.

\* \* \* \* \*